(12) United States Patent
Stoll (10) Patent No.: US 8,966,831 B1
(45) Date of Patent: Mar. 3, 2015

(54) HUNTING BLIND (71) Applicant: Chad Stoll, Buffalo, MN (US)

(72) Inventor: Chad Stoll, Buffalo, MN (US)

( * ) Notice: Subject to any disclaimer, the term of this patent is extended or adjusted under 35 U.S.C. 154(b) by 0 days.

(21) Appl. No.: 13/786,851

(22) Filed: Mar. 6, 2013

(51) Int. Cl.
*E04H 1/00* (2006.01)
*E04H 15/00* (2006.01)
*B65G 65/00* (2006.01)

(52) U.S. Cl.
CPC .............. *E04H 15/001* (2013.01); *B65G 65/00* (2013.01)
USPC ..................... 52/79.4; 52/79.1; 43/1; 403/335

(58) Field of Classification Search
USPC ........................ 52/79.1, 79.4, 79.7, 79.8; 43/1; 403/335, 337, 338
See application file for complete search history.

(56) References Cited

U.S. PATENT DOCUMENTS

| | | | |
|---|---|---|---|
| 2,827,729 A | 3/1958 | Hoene | |
| 2,992,503 A * | 7/1961 | Webb | 43/1 |
| 3,513,605 A | 5/1970 | Smith | |
| 4,186,507 A | 2/1980 | Stinnett | |
| 4,719,716 A * | 1/1988 | Chrisley, Jr. | 43/1 |
| 4,777,755 A | 10/1988 | Colburn | |
| 4,796,649 A * | 1/1989 | Tolomay | 135/137 |
| D339,640 S | 9/1993 | Alberico | |
| 5,241,772 A | 9/1993 | Hall | |
| 5,301,706 A | 4/1994 | Jones | |
| 5,371,966 A | 12/1994 | Hall | |
| D373,403 S | 9/1996 | Hall | |
| 6,286,269 B1 * | 9/2001 | Marcum | 52/79.5 |
| 7,325,364 B2 * | 2/2008 | Leininger et al. | 52/169.6 |
| D584,420 S | 1/2009 | Gibson | |
| 2007/0033854 A1 * | 2/2007 | Ridge | 43/1 |
| 2012/0304551 A1 * | 12/2012 | Preg | 52/65 |
| 2013/0084177 A1 * | 4/2013 | Eriksen et al. | 415/213.1 |

* cited by examiner

*Primary Examiner* — Brian Glessner
*Assistant Examiner* — Adam Barlow
(74) *Attorney, Agent, or Firm* — Peter J. Ims; Westman, Champlin & Koehler, P.A.

(57) ABSTRACT

A modular blind includes a left half and a right half that are constructed through a molding process where one half can be nested within the other half during transit and when displayed for sale. The left half and the right half of the blind include mating flanges that are positioned adjacent each other and secured together to form the blind. A retaining mechanism or plurality of retaining mechanisms is utilized to retain the mating ends proximate each other. Each half of the blind includes a plurality of slots through which a gun barrel can be inserted or through which an arrow can be shot. The blind can optionally include a door in either half or both halves for ingress into and egress from the blind. Because the halves of the blinds can nest within each other, the cost of transportation can be significantly reduced relative to a blind with a monolithic wall construction.

12 Claims, 11 Drawing Sheets

HUNTING BLIND

BACKGROUND

The present invention relates to a hunting blind. More particularly, the present disclosure relates to a modular hunting blind capable of being transported in sections that nest one section inside of the other section, and assembled in a selected location.

Many people hunt both for sport and as a way of obtaining meat to eat. However, large game, such as, but not limited to deer and elk, are very alert and can easily detect a hunter's presence in the game's habitat. When an animal detects an anomaly in an area of its habitat, the animal tends to avoid that area. As such, when the detected anomaly is the hunter, the hunter typically is not able to even attempt to shoot at the game, whether with a gun or with a bow and arrow.

One way to minimize the ability of the game or animal to detect a person's presence, such as a hunter, is to erect a blind in the game's habitat. The blind is a structure in which the hunter positions oneself to conceal the hunter's presence from the game.

The blind typically has walls and a roof, and openings through which the game is viewed. In the case of a hunter, an arrow or bullet is shot through the opening at the game.

It is common for a blind to be made of wood. However, the cost and effort of constructing a wood blind can be prohibitive. Purchasing the necessary pieces of wood in order to construct a blind can be expensive. Erecting a wood blind can also be labor intensive, especially when the blind is being constructed or positioned into an elevated location such as a tree or a platform. Also, wood structures left in the weather can deteriorate over time and require repairs.

Many people would rather utilize a plastic or polymeric molded blind because they are lightweight, easy to install in a selected location and less expensive relative to a wood blind. However, typical blinds constructed of plastic or polymeric material are of a monolithic construction, or otherwise stated the main body of the blind is of a single piece. A typical size for a blind is between about four and seven feet in diameter and between five and seven feet tall.

In order to transport a monolithic plastic or polymeric blind, a single blind is placed on a pallet for transport. Due to the inefficiencies in transporting a monolithic blind, the cost of transporting a single polymeric or plastic blind is about 30% of the total cost of the blind. Therefore the transportation costs associated with a plastic or polymeric blind of a monolithic construction can make the blind less attractive to consumers.

SUMMARY

The present disclosure includes a modular plastic or polymeric blind. Typically, the blind includes a left half and a right half that are constructed through a molding process where one half can be nested within the other half during transit and when displayed for sale. When assembled, the blind is of a sufficient diameter and height to allow a person to easily move within the blind. The left half and the right half of the blind include mating flanges that are positioned adjacent each other and secured together to form the blind. A retaining mechanism or plurality of retaining mechanisms is utilized to retain the mating ends proximate each other. Each half of the blind includes a plurality of slots through which a gun barrel can be inserted or through which an arrow can be shot. Typically the slots provide a 360 degree sight line from within the blind such that the person within the blind can view the terrain surrounding the blind without leaving the blind. The blind can optionally include a door in either half or both halves for ingress into and egress from the blind. Because the halves of the blinds can nest within each other, the cost of transportation can be significantly reduced relative to a blind with a monolithic wall construction.

DETAILED DESCRIPTION

Figure 1:
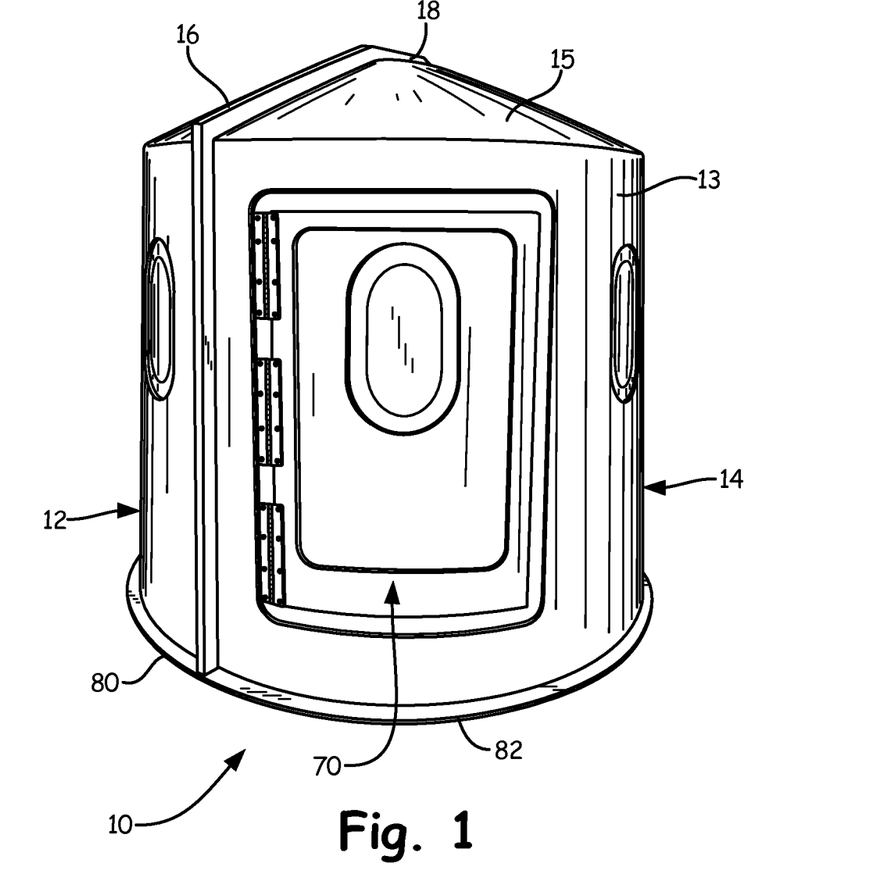
FIG. 1 is a perspective view of a hunting blind.

The present disclosure includes a modular blind that is generally illustrated in FIG. 1 at 10. The blind 10 includes a left half 12 and a right half 14 that are joined together at mating edges 16 and 18, respectively to form the blind 10.

Figure 2:
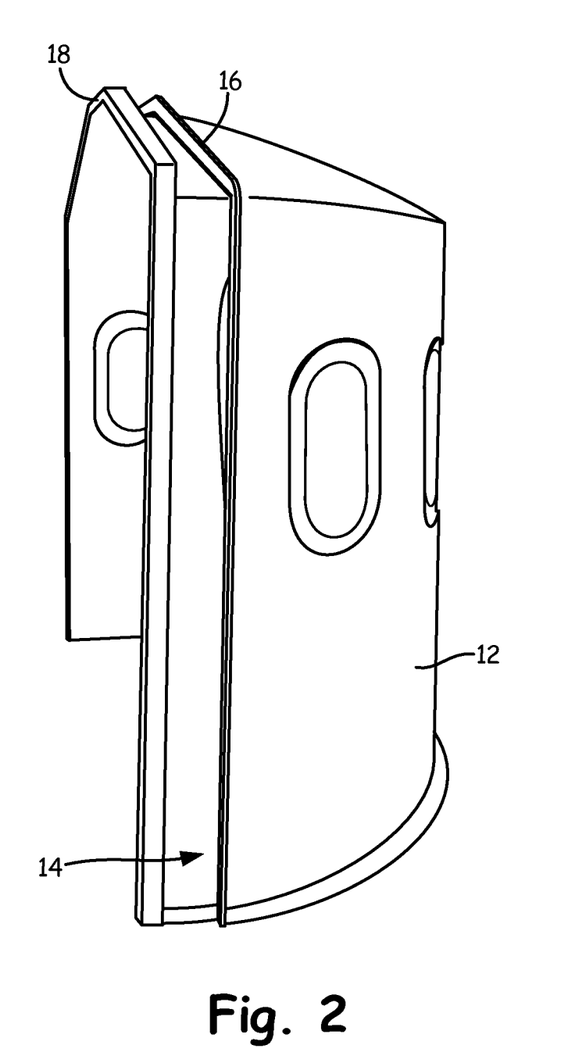
FIG. 2 is a perspective view of two halves of the blind nested within each other.
Figure 3:
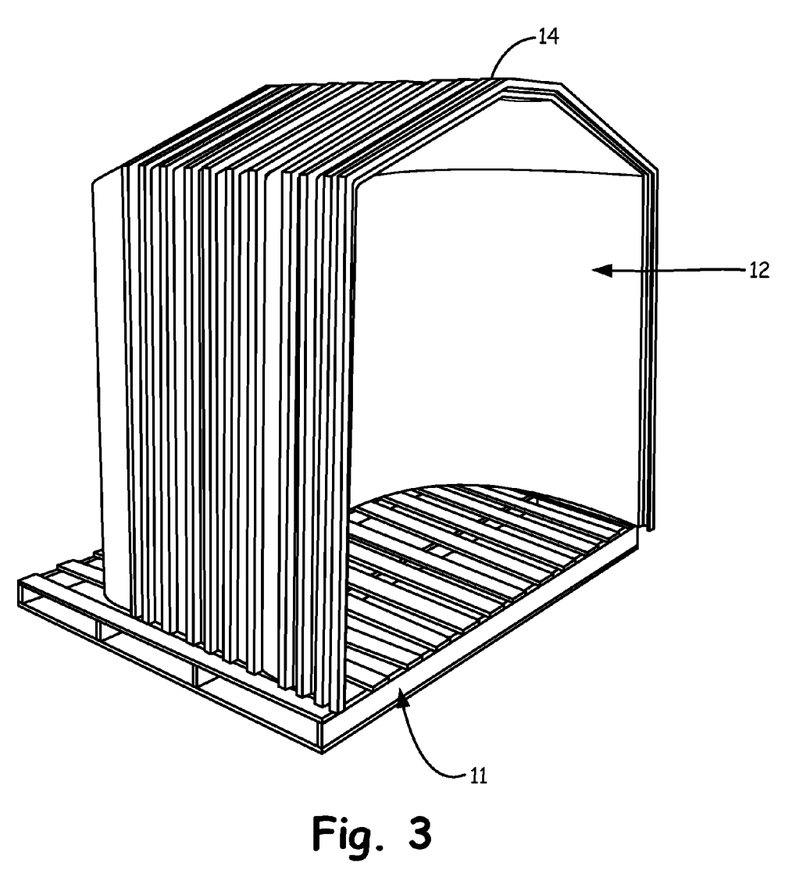
FIG. 3 is a perspective view of a plurality of halves of blinds nested within each other and located on a pallet.

Referring to FIGS. 2 and 3, the left and right halves 12 and 14, respectively, are constructed to be capable of nesting within one another for transport, storage and display. Therefore, due to the ability of the left and right halves 12 and 14 to nest within each other, sixteen halves or eight complete blinds can be shipped on a single pallet 11. As such, the shipping costs of the disclosed blind 10 is about one eighth of the shipping cost of a monolithic blind, where a single blind is shipped on a standard sized pallet. Therefore, the disclosed blind realizes a seven eighths (⅞) reduction in shipping costs relative to a blind having a monolithic construction. Since the shipping costs attribute about 30% of the total cost of a monolithic blind, the disclosed blind 10 can be sold for a reduced price while providing the equivalent size and function of a monolithic blind.

The disclosed blind 10 is also desired by retail outlets because eight blinds can be displayed for sale in the same space as a single monolithic blind. Further, the amount of warehouse space required to store the required inventory is also reduced by about seven eighths (⅞) relative to a monolithic blind.

Referring back to FIGS. 1 and 4-7, the left and right halves 12 and 14 are secured together form the blind 10 with a substantially cylindrical sidewall 13 with a dome shaped roof 15. The blind 10 has a diameter ranging from about 4.5 feet to about 7.0 feet and more typically between about 5.0 feed and about 6.0 feet. The height of the blind ranges from about 5.0 feet to about 7.0 feet, and more typically between about 5.5 feet and about 6.5 feet. However, other dimensions of the blind are also contemplated.

The left and right halves 12 and 14 are constructed using high density polyethylene (HDPE) through a molding process. However, other suitable materials of construction are also contemplated.

The blind 10 as illustrated typically has a cylindrical configuration with a domed or arcuate roof. However, other configurations of the blind 10 are also contemplated provided the components are configured to nest within each other.

Referring to FIGS. 4-9, the left half 12 includes an inner surface 16 and an outer surface 18 that define a side wall 20. The side wall 20 is semi-circular in configuration that terminates at left and right side edges 32 and 34.

The left half 12 includes a plurality of slots 22 that are substantially elliptical in configuration where the slots have a larger side edges 24 than upper and lower arced edges 26. The slots 22 are substantially uniformly positioned about the left half 22 to provide continuous sight line ranging about 180 degrees.

The left half 22 includes a left portion 30 of the arcuate or domed roof 15 that extends upwardly an upper edge of the side wall 20. The left portion 30 of the roof 15 terminates at a left roof edge 36. The left and right edges 32 and 34 of the side wall 20 and the left roof edge 36 of the roof 15 form a continuous left mating flange 36.

The right half 14 includes an inner surface 40 and an outer surface 42 that form a right side wall 44. The side wall 44 is semi-circular in configuration that terminate at left and right side edges 46 and 48, respectively. The right half 14 includes a plurality of slots 49 that are similar in configuration to the slots 22 in the left half 12 where the slots 49 are defined by side edges 50 that are larger than the upper and lower arched edges 52.

Figure 11:
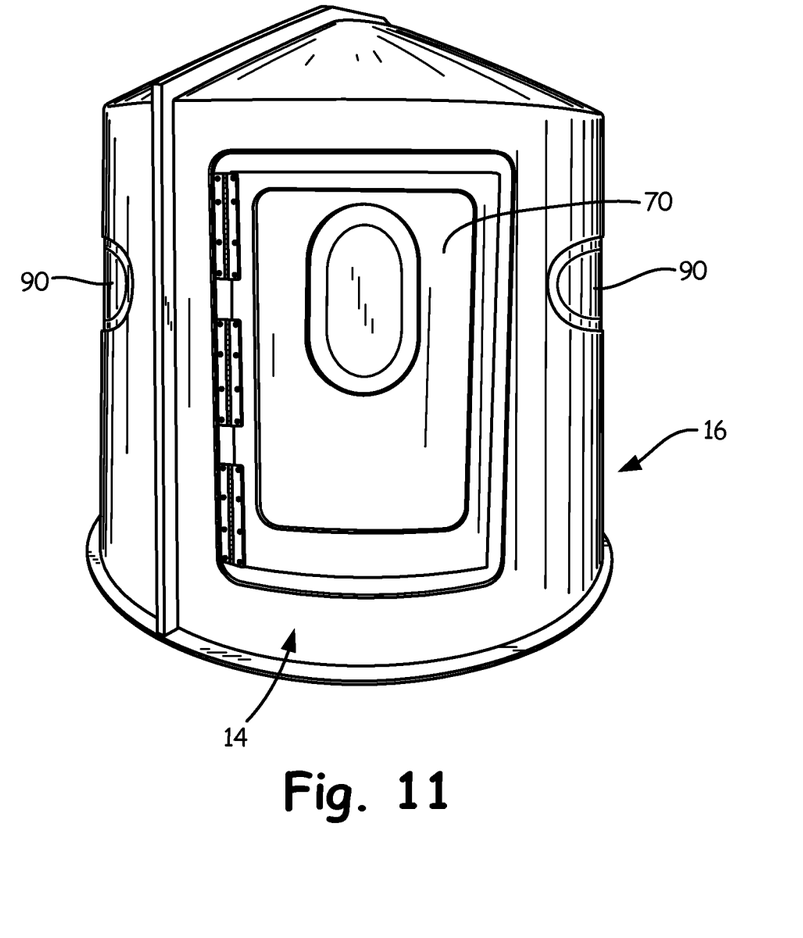
FIG. 11 is a perspective view of another blind.
Figure 12:
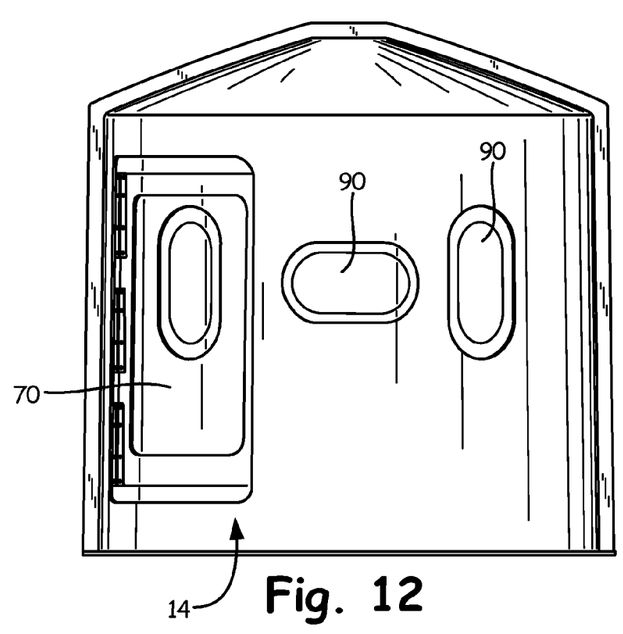
FIG. 12 is a front view of the blind illustrated in FIG. 11.
Figure 13:
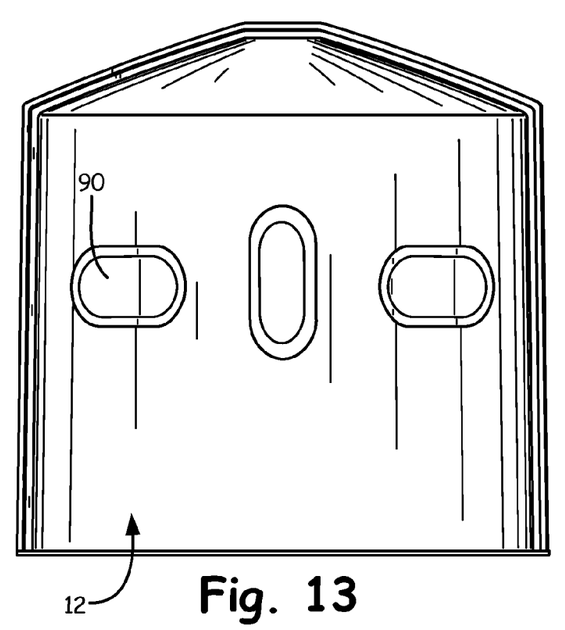
FIG. 13 is a back view of the blind illustrated in FIG. 11.

Referring to FIGS. 11-13, the slots 90 can also be oriented where the long edges are horizontal and short edges are vertical. Also, it is contemplated to include both vertical orientated slots 22 and 49 and horizontal orientated slots 90 within the same blind 10. The slots 22, 49 and 90 are typically about 10 inches by 18 inches. However, other dimensions for the slots 22, 49 and 90 are also contemplated While substantially elliptical shaped slots 22, 49 and 90 are contemplated, other slots having different configurations, such as a circle or a rectangle, are also contemplated.

Referring back to FIGS. 4 and 8, the right half 12 includes an arcuate roof portion 54 that extends from an upper edge of the side wall 44 and terminates at a right roof edge 56 that is even with the left and right side edges 46 and 48 of the right side wall 44. The left and right edges 46 and 48 and the right roof edge 56 form a continuous right mating flange 58 that engages the continuous left mating flange 36.

Figure 4:
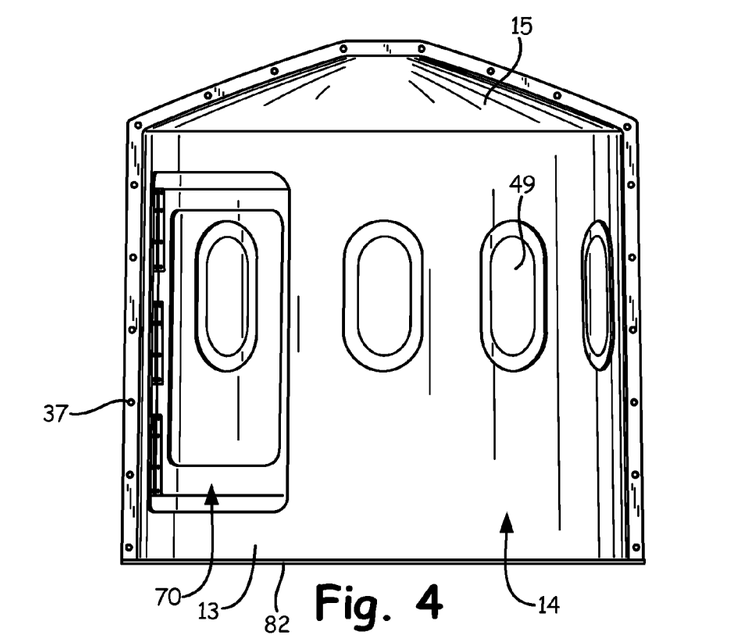
FIG. 4 is a front view of the blind.
Figure 5:
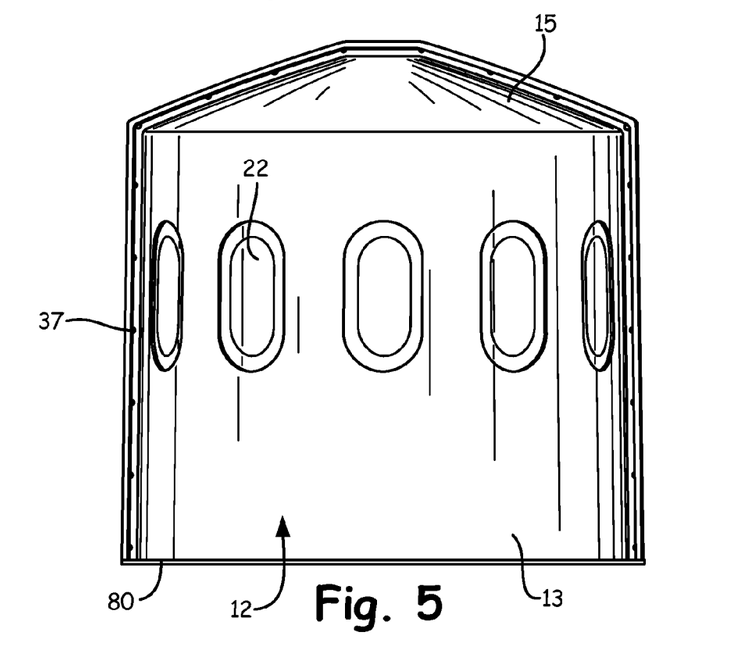
FIG. 5 is a back view of the blind.
Figure 6:
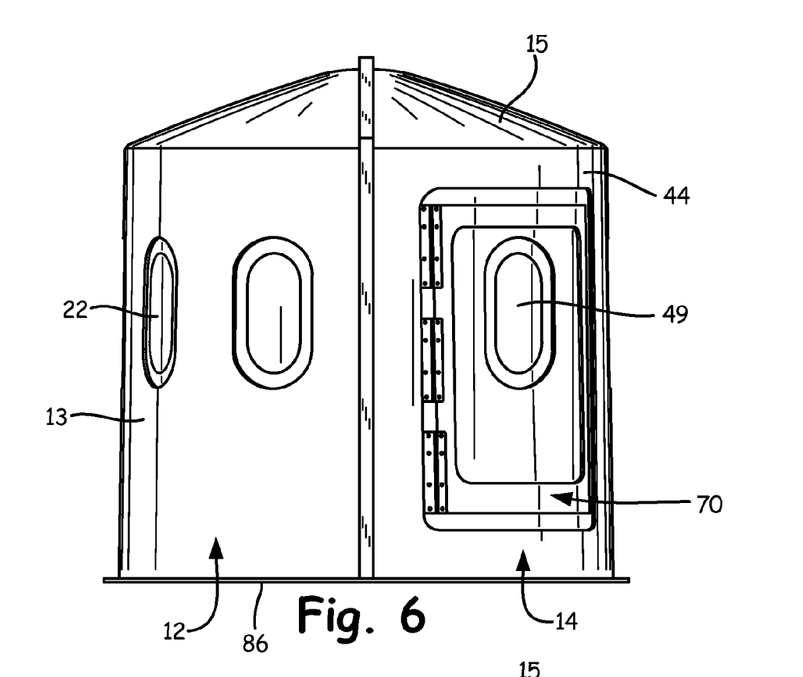
FIG. 6 is a right side view of the blind.
Figure 7:
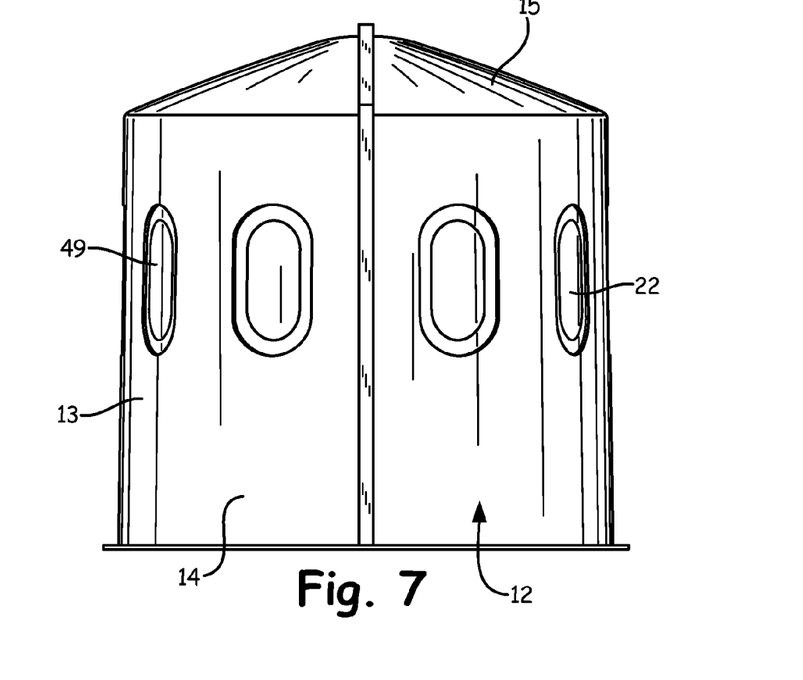
FIG. 7 is a left side view of the blind.
Figure 8:
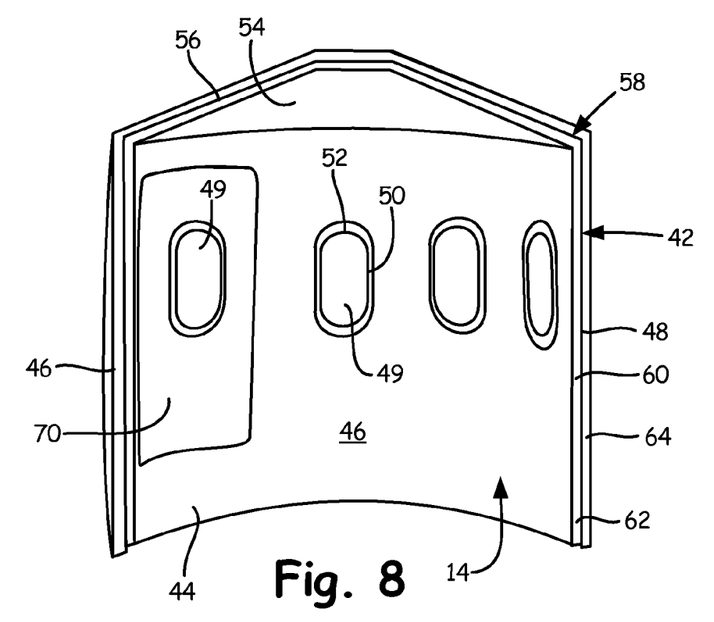
FIG. 8 is a perspective view of the right half of the blind.
Figure 9:
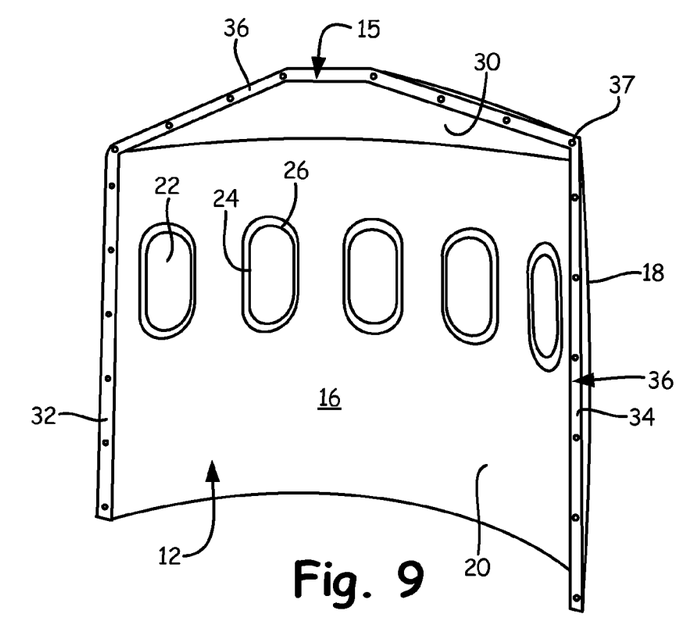
FIG. 9 is a perspective view of the left half of the blind.
Figure 10:
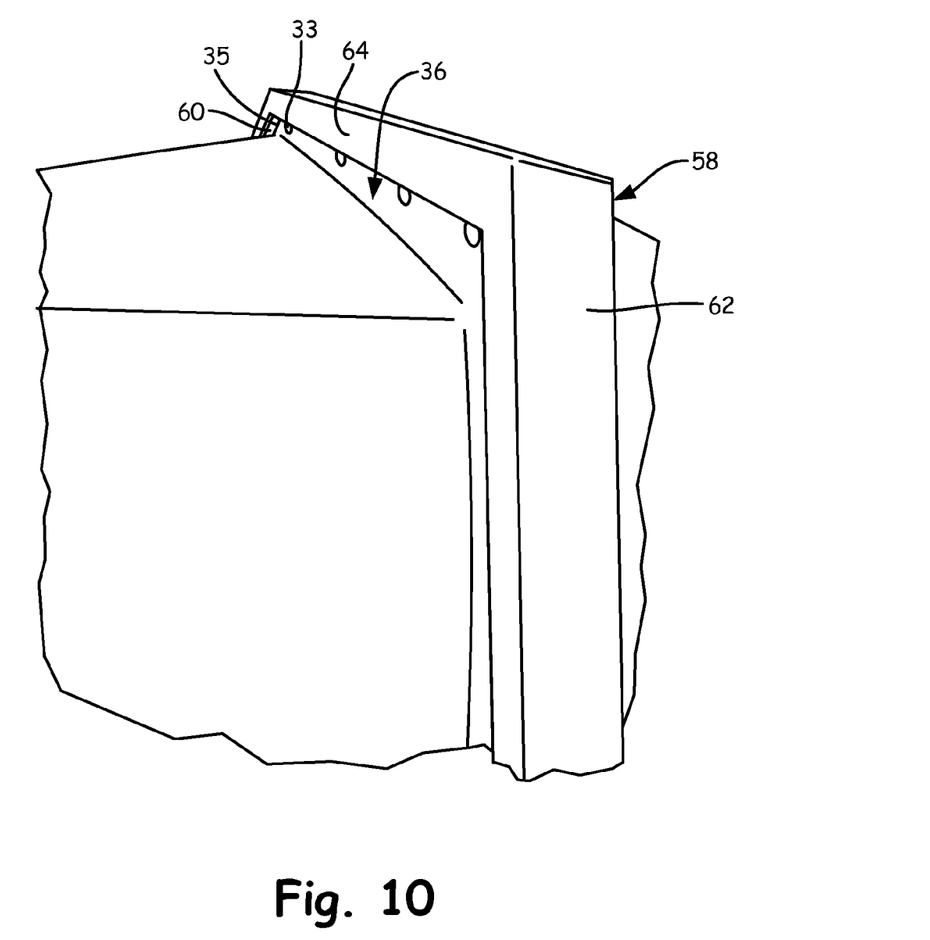
FIG. 10 is a partial perspective view of the mating edges of the left and right halves of the blind.

Referring to FIGS. 4, 8 and 10, the left mating flange 36 has a substantially flat surface 33 with an outer edge 35 that nests within a shoulder 60 of the right mating flange 58. The shoulder 60 is defined by a extension 62 and an outwardly extending portion 64 where the outer edge 35 of the left mating flange 36 is proximate the outwardly extending portion 64. The outwardly extending portion 64 extends beyond the left mating flange 36 such that the seam between the left half 12 and the right half 14 is covered by the outwardly extending portion 64.

The seating of the left mating flange 36 within the shoulder 60 in the right mating flange 58 prevents water from entering the interior of the blind 18 through the seam between the left and right halves 12 and 14, respectively, and therefore prevent the person situated within the blind 10 from becoming wet when precipitation falls. However other sealing mechanisms are also contemplated including a gasket, caulking the seam, a snap fit or other sealing configurations.

The flanges 36 and 38 include aligned through bores through which bolts 37 threadably engage nuts to secure the left half to the right half 12 and 14, respectively. However other retaining mechanisms are also contemplated including, but not limited to, an adhesive, a snap fit, rivets, a frictional engagement and coupler that fits over the adjacent mating flanges of the two halves.

Figure 14:
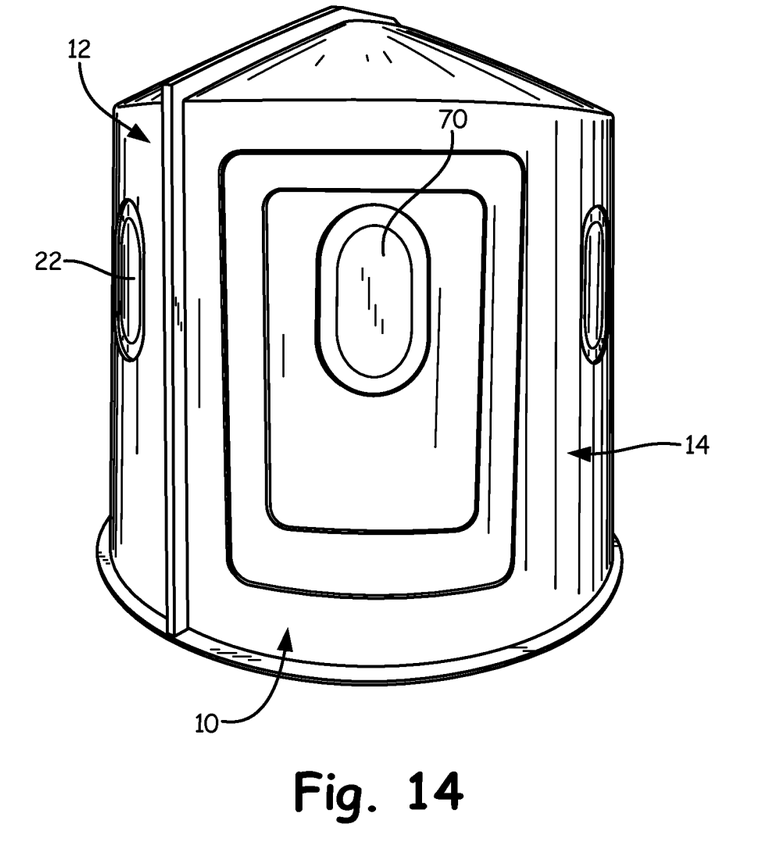
FIG. 14 is a perspective view of a blind without a door.

As illustrated, the right half 14 includes a door 70 that is hingedly attached to the side wall 44 to provide an opening for ingress into and egress from the blind 10. The door 70 is arced at the same radius as the side wall 44 of the right half 14 to provide an even inner and outer surface. The door 70 includes an outdoor handle 71 and an indoor handle, both of which can manipulate a latch, such that the door 70 can be opened from either outside of the blind 10 or inside the blind 10. However, the door 70 can be located in the left half 12 or be included in both the left half 12 and the right half 14. It is also contemplated that the blind 10 does not include a door where access is provided to the blind from below the blind 10 as illustrated in FIG. 14.

The door 70 includes a slot 49 which can be opened or closed. Having a slot 49 in the door 70 ensures that the hunter has 360 degree sight lines around the blind.

The left half 12 and the right half 14 both have a bottom flange 80 and 82, respectively, having ends that meet to form a substantially uninterrupted surface about the perimeter of the blind 10. The bottom flanges 80 and 82 are utilized to secure the blind 10 in a desired location, such as, but not limited to, an elevated platform.

Figure 15:
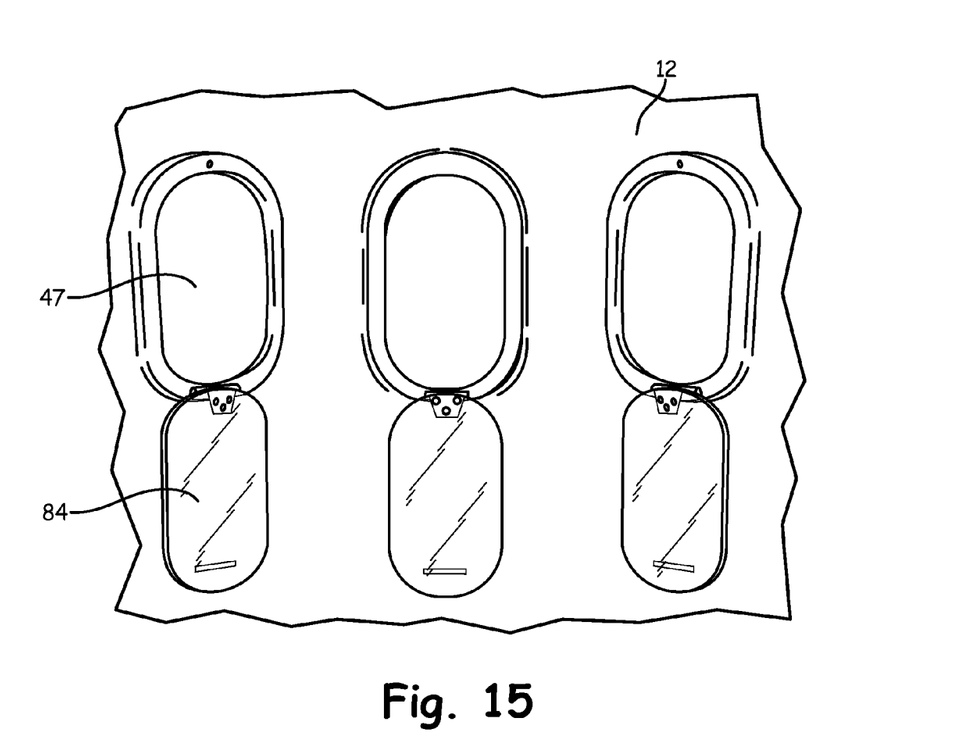
FIG. 15 is a partial perspective view of the windows with the covers in an open position.
Figure 16:
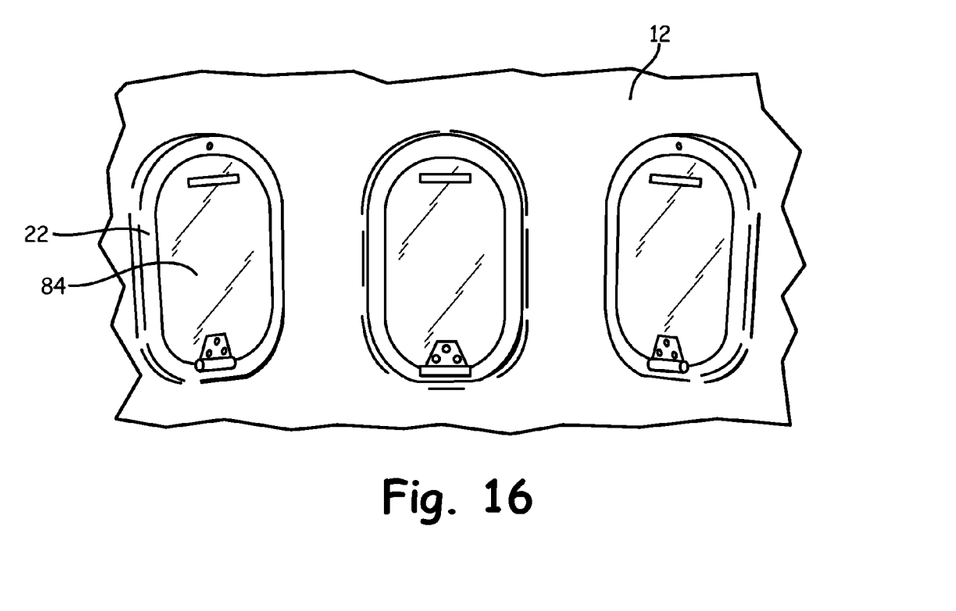
FIG. 16 is a partial perspective view of the windows with the covers in a closed position.

Referring to FIGS. 15 and 16, the blind 10 may optionally include covers 84 for the slots 22, 49 and 90 that are hingedly attached to an interior surface of the blind 10 such that the plurality of slots 22, 49 and 90 in the left half and the right half 12 and 14 all respectively, may be covered or open depending upon the hunter's needs. The covers 84 may be secured in a closed position with a latch to provide protection from the elements or may be opened to Therefore, the disclosed blind 10 includes halves 12 and 14 that can be nested within each other to provide efficiencies in transporting and displaying the blind. Further, the halves 12 and 14 of the blind 10 fit into a standard bed of a pickup truck, and therefore, can be easily transported to a location for assembly. Because the blind 10 includes two halves 12 and 14 and is made of a lightweight plastic or polymer, the blind 10 can be easily assembled at a desired location and easily elevated and secured in a desired location. Also because the blind 10 is constructed from a plastic or polymer, minimal to no maintenance is required and the blind 10 can be painted to camouflage the blind 10 from the game.

Although the present invention has been described with reference to preferred embodiments, workers skilled in the art will recognize that changes may be made in form and detail without departing from the spirit and scope of the invention.

The invention claimed is:

1. A hunting blind comprising:
a first half having a first mating portion proximate a first mating edge, the first mating portion comprising a first substantially flat mating flange extending substantially perpendicular to the first mating edge and substantially along the entire first mating edge; and
a second half having a second mating portion proximate a second mating edge wherein the second mating portion comprises a second substantially flat mating flange extending substantially perpendicularly from the second mating edge and substantially along the entire second mating edge and an extension extending substantially perpendicularly from the second substantially flat mating flange wherein the second substantially flat mating flange and the extension define a shoulder into which the first substantially flat mating portion is positioned such that the extension covers a vertical seam between the first and second substantially flat mating flanges when the first and second mating edges are positioned proximate each other and wherein either half is configured to nest within the other half.

2. The hunting blind of claim 1 and wherein when the first and second mating edges are secured together a waterproof seal is formed therebetween.

3. The hunting blind of claim 1 and wherein the first and second halves both comprise a semicircular side wall and a half of a roof extending from the side wall such that when the first and second halves are joined together, the blind has a cylindrical sidewall with a roof.

4. The hunting blind of claim 3 and wherein the roof comprises a domed configuration.

5. The hunting blind of claim 1 and wherein the first and second halves both comprises a plurality of windows therein wherein the windows are configured to shoot a bullet or arrow therethrough.

6. The hunting blind of claim 5 and wherein the plurality of windows have a vertical, elliptical configuration.

7. The hunting blind of claim 5 and wherein the plurality of windows comprise both vertical, elliptical openings and horizontal, elliptical openings.

8. The hunting blind of claim 5 and further comprising a plurality of covers hingedly attached to the first and second halves, each cover configured to close one of the plurality of windows.

9. The hunting blind of claim 1 and further comprising a door in either the first or second half.

10. The hunting blind of claim 8 and wherein a latch on the door can be actuated with a handle either inside of the blind or a handle located on an outside of the blind.

11. The hunting blind of claim 2 and wherein the mating edges are secured together with at least one retaining mechanism.

12. The hunting blind of claim 11 and wherein the retaining mechanism comprises a plurality of bolts that threadably engage nuts to secure the first and second mating edges together.

\* \* \* \* \*